United States Patent
Rider et al.

(10) Patent No.: US 9,892,098 B2
(45) Date of Patent: Feb. 13, 2018

(54) HTML TAG FOR IMPROVING PAGE NAVIGATION USER EXPERIENCE

(75) Inventors: Tomer Rider, Naahryia (IL); Aviv Ron, Klachim (IL); Yevgeniy Kiveisha, Bney Aish (IL); Yair Giwnewer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 13/996,993

(22) PCT Filed: Dec. 29, 2011

(86) PCT No.: PCT/US2011/067892
§ 371 (c)(1),
(2), (4) Date: May 1, 2014

(87) PCT Pub. No.: WO2013/101089
PCT Pub. Date: Jul. 4, 2013

(65) Prior Publication Data
US 2014/0298155 A1  Oct. 2, 2014

(51) Int. Cl.
*G06F 17/00* (2006.01)
*G06F 17/22* (2006.01)
(Continued)

(52) U.S. Cl.
CPC ........ *G06F 17/2247* (2013.01); *G06F 3/0488* (2013.01); *G06F 17/218* (2013.01);
(Continued)

(58) Field of Classification Search
CPC ........... G06F 17/2213; G06F 17/30905; G06F 17/2247; G06F 17/30899; G06F 17/30861;
(Continued)

(56) References Cited

U.S. PATENT DOCUMENTS 7,509,585 B1   3/2009  Gauthier et al.
8,887,085 B1 * 11/2014  Cox ................... G06F 3/04855
                                                  715/786
(Continued)

FOREIGN PATENT DOCUMENTS

TW  200636516 A  10/2006
TW  201040761 A  11/2010
(Continued)

OTHER PUBLICATIONS

Heilmann, Christian, "Creating Multiple Pages with Navigation Menus", Opera Web Standards Curriculm, http://wwvv.w3.org/wiki/Creating_multiple_pages_with_navigation_menus. See a whole document, (Aug. 22, 2011).
(Continued)

*Primary Examiner* — Quoc A Tran
(74) *Attorney, Agent, or Firm* — Schwegman Lundberg & Woessner, P.A.

(57) ABSTRACT

Various systems and methods for navigating paginated items results are described herein. A web browser receives, from a server, a markup language document including a subset of a plurality of item listings. The web browser detects a paging tag in the markup language document tags that identifies attributes identifying a current page number of the plurality of item listings, a total page count of the plurality of item listings, and a number of item listings on the current page. Pagination navigation information is updated in accordance with the attributes in the paging tag. The page markup language document with the subset of the plurality of item listings may be displayed.

23 Claims, 4 Drawing Sheets

(51) Int. Cl.
*G06F 17/21* (2006.01)
*G06F 3/0488* (2013.01)
*G06Q 30/02* (2012.01)
*G06F 17/30* (2006.01)

(52) U.S. Cl.
CPC .. *G06F 17/30861* (2013.01); *G06F 17/30864* (2013.01); *G06F 17/30896* (2013.01); *G06F 17/30905* (2013.01); *G06F 17/3089* (2013.01); *G06F 17/30867* (2013.01); *G06Q 30/02* (2013.01)

(58) Field of Classification Search
CPC .......... G06F 30/0488; G06F 17/30844; G06F 17/3089; G06F 17/30864; G06F 17/30867; G06Q 30/02
USPC ................................ 715/234, 838, 781, 222
See application file for complete search history.

(56) References Cited

U.S. PATENT DOCUMENTS

| | | | |
|---|---|---|---|
| 2002/0154159 | A1 | 10/2002 | Day et al. |
| 2006/0064411 | A1* | 3/2006 | Gross ............... G06F 17/30864 |
| 2008/0243776 | A1* | 10/2008 | Brunner ............ G06F 17/30864 |
| 2008/0263023 | A1* | 10/2008 | Vailaya ............. G06F 17/30675 |
| 2009/0150769 | A1 | 6/2009 | Konnola et al. |
| 2010/0145967 | A1* | 6/2010 | Fu ..................... G06F 17/30905 |
| | | | 707/758 |
| 2010/0251085 | A1 | 9/2010 | Zearing et al. |
| 2010/0257486 | A1 | 10/2010 | Smith |
| 2011/0126113 | A1 | 5/2011 | Sharma et al. |
| 2012/0254720 | A1* | 10/2012 | Hamm .............. G06F 17/30899 |
| | | | 715/234 |
| 2015/0193547 | A1* | 7/2015 | Burkard ............ G06F 17/30902 |
| | | | 709/203 |

FOREIGN PATENT DOCUMENTS

| | | |
|---|---|---|
| TW | 201333725 A | 8/2013 |
| WO | WO-2013101089 A1 | 7/2013 |

OTHER PUBLICATIONS

"European Application Serial No. 11878990.8, Extended European Search Report dated Aug. 3, 2015", 6 pgs.

"International Application Serial No. PCT/US2011/067892, International Preliminary Report on Patentability dated Jul. 10, 2014", 6 pgs.

"Taiwanese Application Serial No. 101149338, Response filed Apr. 8, 2016 to Office Action dated Sep. 10, 2015", (English Translation of Claims), 79 pgs.

"Taiwanese Application Serial No. 101149338, Response filed Sep. 10, 2015 to Office Action mailed May 4, 2015", 15 pgs (English Translation of Claims.

"International Application Serial No. PCT/US2011/067892, Search Report dated Sep. 17, 2012", 3 pgs.

"International Application Serial No. PCT/US2011/067892, Written Opinion dated Sep. 17, 2012", 4 pgs.

Heilmann, Christian, "Creating Multiple Pages with Navigation Menus", Opera Web Standards Curriculm, http://www.w3.org/wiki/Creating_multiple_pages_with_navigation_menus. See a whole document, (Aug. 22, 2011).

"European Application Serial No. 11878990.8, Communication Pursuant to Article 94(3) EPC dated Mar. 21, 2017", 6 pgs.

"Taiwanese Application Serial No. 101149338, Office Action dated May 4, 2015", w/English Translation, 10 pgs.

"Taiwanese Application Serial No. 101149338, Office Action dated Jun. 28, 2017", w/English Claims, 6 pgs.

"Taiwanese Application Serial No. 101149338, Office Action dated Sep. 10, 2015", w/English Claims, 11 pgs.

* cited by examiner

```
<!DOCTYPE HTML>
<HTML XMLNS="HTTP://WWW.W3.ORG/1999/XHTML" >
<HEAD>
    <TITLE>SEARCH USING THE NEW PAGING ELEMENT</TITLE>
</HEAD>
<BODY>
SEARCH RESULTS (SHOWING PAGE 1 OUT OF 5).<BR/>
<PAGING PAGE_NUM="1" TOTAL_PAGES="5" ITEMS="4" PREV="P.HTML" NEXT="N.HTML" TOTAL_ITEMS="20" >
    <A HREF= ..LINK1.. > SEARCH RESULT 1 </A>
    <A HREF= ..LINK2.. > SEARCH RESULT 2 </A>
    <A HREF= ..LINK3.. > SEARCH RESULT 3 </A>
    <A HREF= ..LINK4.. > SEARCH RESULT 4 </A>
</PAGING>
</BODY>
</HTML>
```

*FIG. 2*

HTML TAG FOR IMPROVING PAGE NAVIGATION USER EXPERIENCE

PRIORITY APPLICATION

This application is a U.S. National Stage Application under 35 U.S.C. 371 from International Application No. PCT/US2011/067892, filed Dec. 29, 2011, which is hereby incorporated by reference in its entirety.

TECHNICAL FIELD

Embodiments pertain to the use of web browsers on a variety of devices.

BACKGROUND

Many web pages contain paging. Paging is a method of portioning large amount of data into smaller portions in order to display one portion at a time on the user interface. Paging is used in search results, shopping sites, etc. Although paging is a commonly used feature in web applications, there is no native support for paging in the hypertext markup language (HTML). Consequently the user needs to navigate between pages using navigations controls that the web page has provided. This mode of navigation may be considered non-intuitive and cumbersome.

BRIEF DESCRIPTION OF THE DRAWINGS

FIG. 2 is example code illustrating a web page, according to an example embodiment;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The present disclosure provides techniques and configurations used for providing browser based pagination controls through a "PAGING" HTML element (also referred to as a tag when used between '<' and '>'). The <PAGING> tag may signal the web browser (e.g., a stand-alone browser or one embedded in an application) that the content within the tag is one page within a set of pages, where the entirety of the pages constitute the results of a request. This allows the browser to provide unified user friendly navigation between pages that will not be dependent on the specific user interface of the web application (e.g., a web page). For example, clicking on the right or left arrows on the keyboard may navigate to the next or previous pages of results accordingly. For touch screen interfaces, a swipe gesture to the right or left may navigate between pages. Gesture recognition may allow a swipe of the hand in the air to the right or left to navigate between pages. In various embodiments, the <PAGING> tag includes attributes for next and previous page addresses, the page number, the total number of pages, and the number of items per page. The element name of "PAGING" is exemplary in nature and other terms may be used without departing from the scope of this disclosure.

The use of the <PAGING> tag may have many improvements over existing navigation controls. For example, web applications that use the <PAGING> tag may be navigated in the same way using the same gestures. Another improvement is that it may allow a more intuitive browsing experience. That is, navigation between pages is done by an intuitive gesture like a swipe or keyboard arrows and not by the sometimes cumbersome action of bringing the mouse pointer to a specific button on the user interface, which may involve scrolling, in order to click it. This is especially the case when browsing using a smaller form device such as a mobile phone where the numbers or controls to go to navigate pages are often small and easy to miss. This further allows different paging mechanisms for different form factors. The use of the <PAGING> tag may also allow a dedicated and simpler method for application developers to control paging events and data. Therefore, as paging does not need to be custom built for each application by developers, more developers may choose to use paging within their applications.

Figure 1:
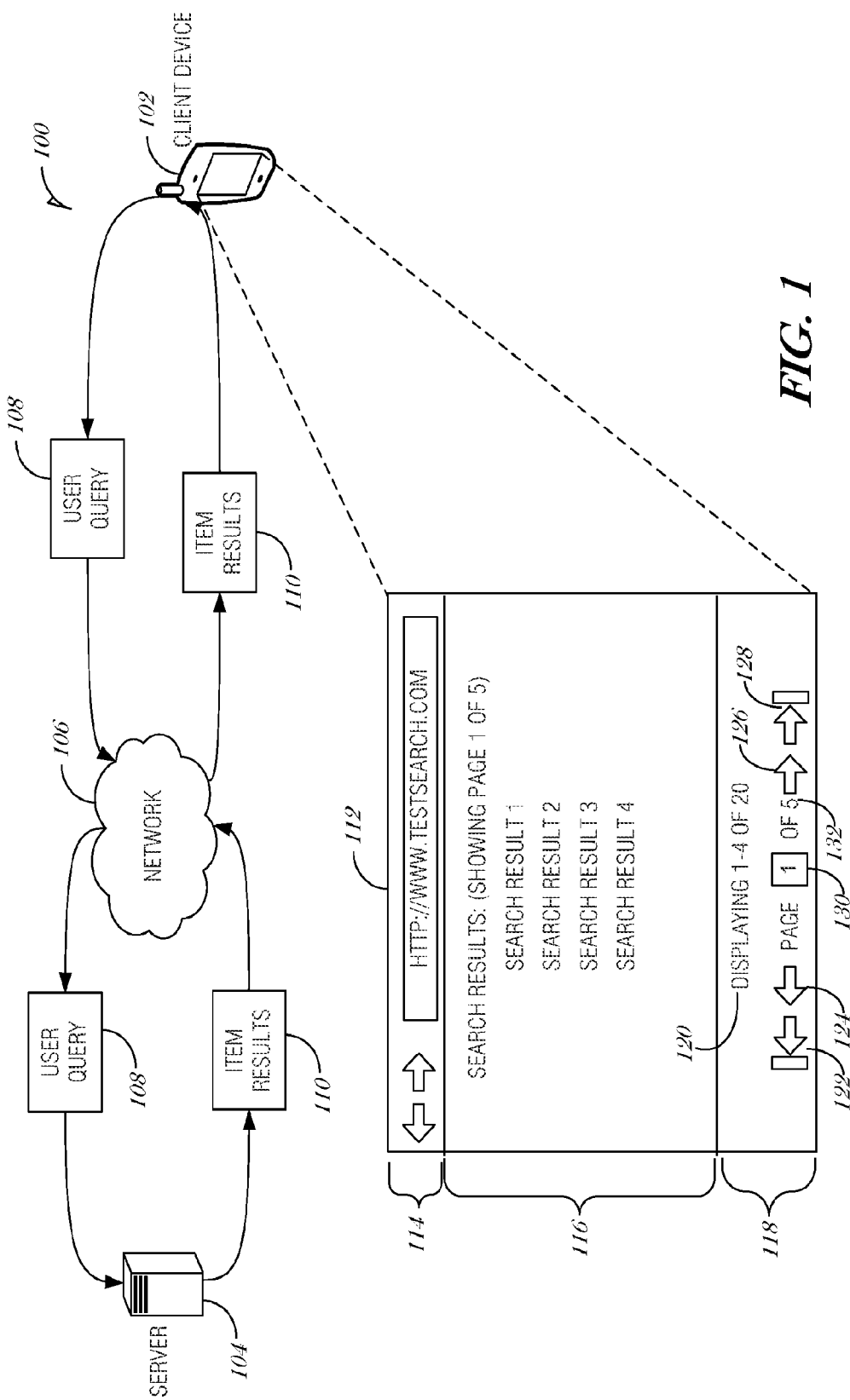
FIG. 1 is a schematic diagram illustrating a system for providing browser based pagination controls, according to an example embodiment.

FIG. 1 is a schematic diagram illustrating system 100 for providing browser based pagination controls, according to an example embodiment. FIG. 1 includes client device 102, server 104, and network 106. Further illustrated, is user query 108, item results 110, and browser 112, which may be displayed on a display device of client device 102. Browser 112 includes header portion 114, content window 116, and pagination navigation controls 118. Finally, within pagination navigation controls 118, is summary 120, first page of results control 122, previous page of results control 124, current page number 130, total pages 132, next page of results control 126, and last page of results control 128.

In various embodiments, client device 102 is a smartphone, cellular telephone, mobile phone, laptop computer, desktop computer, tablet computer, game system, or other device capable of using a web browser. Client device 102 may be equipped with network capabilities and a user interface to receive information from a user and provide information to a user. A user of client device 102 may utilize browser 112 to submit user query 108 through network 106 to server 104. In various embodiments, client device 102 includes its own display device. In an embodiment, client device 102 is communicatively coupled to an external display device. Using client device 102, a user may search for a product, service, or information using browser 112. The graphical user interface of browser 112 may include a search interface with a search field. The search field may be used to receive the query from the user.

Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. Network 106 may include a single local area network (LAN) or wide-area network (WAN), or combinations of LANs or WANs, such as the Internet. The various devices coupled to network 106 may be coupled via one or more wired or wireless connections.

Server 104 may communicate with internal databases or file servers to publish or serve files via a web server. Server 104 may include a web server. The web server may consist of scripts, applications, or library files that provide primary or auxiliary functionality to the web server (e.g., multimedia, file transfer, or dynamic interface functions). The web server, either alone or in conjunction with one or more other computers, may provide a user-interface to a user of client device 102. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

Server 104 may represent a group of two or more servers, cooperating with each other, provided by way of a pooled, distributed, or redundant computing model. Further, server 104 may be implemented as a distributed system; for example, one or more elements of server 104 may be located across a wide-area network from other elements of server 104.

Server 104 may be configured to paginate item results 110 to client device 102 in response to a user query 108. In various embodiments, pagination is a process of dividing content into multiple pages. Each page of the paginated content may include one or more discrete items. Pagination may occur dynamically (e.g., upon request) or may be done before the content is served to a requester. For example, a user may transmit a user query 108 to server 104 for a piece of content. As a running example throughout this document, the user query may be considered a search query submitted to a web search engine (e.g., as an HTTP request) and the content may be considered the search results organized as a set of web links. A search query may include one or more keywords or regular search expressions. However, the use of the <PAGING> tag is not so limited. For example, paginated content may be served to a user without a search query such as by a user navigating directly to a website which has a multiple pages of item listings. In an embodiment, a direct request is considered a user entering in a specific web page address. Item listings in either case may include web links, products, e-books, documents, or other items associated with the user's request.

In various embodiments, after receiving the search query from the user, server 104 formats a response for transmission back to the user of client device 102. Formatting may include determining which web links to include in the response. The links may include web links they have been deemed similar (e.g., using a similarity algorithm) to the search query. This may include server 104 accessing one or more databases of existing content or dynamically gathering results. In various embodiments, server 104 stores results for common searches. These results may be periodically (e.g., hourly, daily) updated.

As the results may include thousands if not millions of web links, server 104 breaks up the results into a series of pages of web links as needed. Thus, a subset of the universe of results may be transmitted to client device 102 at any given time. When browsing on the internet, one often comes across articles that have been split across multiple pages. However, the splitting of existing articles is different than splitting dynamically created search results. For example, paginated articles often have dedicated links such as "articlePage1.html" and "articlePage2.html." These pages are generally already created and stored in a static form on a web server before being transmitted to a user. In contrast, with paginated search results, generally pages do not exist for each page of search results. Instead, a page of results is dynamically created and served to the user. Thus, if a user request the fifth page of results, server 104 may re-run the search query and deliver web links 50-60 in a web page. Alternatively, if the query is a common query or a recent query, server 104 may access a database for the results and deliver the requested items listings formatted in a web page.

FIG. 2 is example code 200 illustrating a web page, according to an example embodiment. In an embodiment, code 200 may be interpreted by a markup language interpreter such as browser 112 and presented as content rendered within content window 116 of FIG. 1. As illustrated, code 200 include tags identified by '<' and '>' symbols. Tags are used to provide formatting to content within the tags as well as attributes associated with the content. Content may be placed between an open tag and an end tag. For example, a "<B>" tag indicates a start bold tag and "</B> indicates an end bold tag. Thus, text between the tags is bolded when displayed in a content window of a browser. Tags may also have attributes. For example, "<IMG src='img.jpg' height='40' width='40'>" is an image tag with three attributes: src, height, and width. The "src" attribute identifies the location of an image and the height and width attributes identify the height and width of the image when displayed. The tags may be defined according to a common standard such as HTML. Various markup language interpreters may be considered HTML compliant when they are able to correctly read and process HTML elements and tags.

FIG. 2 includes start <PAGING> tag 202 and end </PAGING> tag 206 for use in paginated item results. In an embodiment, start paging tag 202 includes six attributes, however, not all six attributes need to be used or included, and others may be added. The six attributes shown are "page_num" 208, "total_pages" 210, "items" 212, "prev" 214, "next" 216, and "total_items" 217. The value of "page_num" 208 identifies the current page of a paginated set of results and the value of "total_pages" 120 identifies the total number of pages of results. In an embodiment, the value of "items"212 identifies the number of items displayed per page of results. The values of "prev" 214 and "next" 216 indicate links to the previous page and next page of results, respectively. The value of "total_items" 217 may represent the total number of items in the search results. In an embodiment, a default set of attributes may include "page_num" 208, "total_pages" 210, "items" 212, and "total_items" 217.

Further illustrated are item results 204. While not illustrated, the PAGING element may include other attributes such as a "last_page" attribute and "first_page" attribute. As illustrated the <A> (i.e., an anchor) tag has an attribute identifying a universal resource location (URL) for a search result. However, instead of displaying the URL, a browser will display the text between the start and end anchor tags.

Referring back to FIG. 1, code 200 from FIG. 2 may be interpreted by browser 112 and displayed in content window 116. As illustrated, the tags are not displayed in the content window. Instead, the tags are processed and the text or other content between the tags is displayed. As stated above, browser 112 is displayed with header portion 114, content window 116, and pagination navigation controls 118. In various embodiments, header portion 114 includes back and forward controls as well as an address bar. A user may enter a URL into the address bar to send a request for a web page.

In various embodiments, header portion 114 is part of the browser's user interface. In other words, the back and forward controls do not change based on information included in a received web page. In contrast, navigation controls may be provided by a web page and displayed in content window 116. Pagination navigation controls 118 are also part of the user interface of browser 112, but be dynamically updated based on information within a <PAGING> tag. The layout and design of pagination navigations controls 118 is only one example and others may be used without departing from the scope of this disclosure.

The back and forward controls in header portion 114 may be used by the user to go to navigate through previously visited web pages. In various embodiments, browser 112 maintains a history of visited web pages. Thus, when a user clicks, or otherwise, activates the back page control in header portion 114, the browser may access the history or web page and retransmit the request for the web page most recently viewed by the user.

In various embodiments, pagination navigation information is updated according to the values of attributes included in the <PAGING> tag. The pagination navigation information may include data for each attribute in the <PAGING> tag. For example, upon receiving a web page, browser 112 parses the web page HTML code and detects that a <PAGING> tag is present. Then, browser 112 reads the values of the attributes of the <PAGING> tag. Collectively, the read values may be stored as pagination navigation information. The pagination navigation information may also associate a read value with a pagination navigation control. For example, the "next" attribute may be associated with next page of results control 126.

In various embodiments, the pagination navigation information may be used for navigating a plurality of pages of search results. For example, if a user uses a hand gesture that is associated with going to the next page of results that browser may retrieve the stored value in the pagination navigation information associated with the "next" attribute and send a request to the attributes value (e.g., "n.html"). In various embodiments, the pagination navigation information is read in real time from the attributes of <PAGING> tag at the time of the gesture instead of retrieving a store value.

In various embodiments, pagination navigation information controls 118 may also be updated according the pagination navigation information. For example, with reference to FIG. 2, elements 208 and 210 indicate that the current page number is one and there are five total pages of item results. Thus, current page control 130 and total pages 132 may updated to display "1" and "5," respectively.

First page of results control 122, previous page of results control 124, next page of results control 126, and last page of results control 128 may be hidden when not available. For example, while first page of results control 122 is shown in FIG. 1, it may be hidden when the <PAGING> attributes indicate the results are from the first page of results. Furthermore, all of the pagination navigation controls may be hidden in various embodiments. For example, consider that client 102 is a tablet device which has the capability to use gesture input controls. Thus, the need for a user to click on one of the pagination navigation controls is obviated. Instead, a user may swipe (e.g., right to left) on the display device of client device 102 to activate the next page of results control. Different gestures may control different pagination navigation controls.

In various embodiments, different web browser use different input mechanisms for actuation of the pagination navigation controls. In various embodiments, multiple input mechanism (e.g., voice, gesture, mouse) may be used by a web browser.

Browser 112 may also define a default location of where pagination navigation controls 118 are shown (e.g., in header area 114, below content window 118, etc). A user may change this location through a user preference. A user may also define a preference for how many item results 110 to display at a time in content window 116.

In various embodiments, actuation of a pagination navigation controls by any input mechanism causes a request to made to server 104 for a different subset of search results. For example, activating next page of results control 126 may transmit a request for the next page (e.g., the next four) of results. In various embodiments, <PAGING> tag includes an attribute that defines a URL for requesting the next page of results. In an embodiment, the default address for retrieving additional search results is the same address the query was originally transmitted to. Thus, browser 112 may send a request to the URL to retrieve the next page of results.

In various embodiments, a generic results request page is defined in the <PAGING> tag which may be used to request in navigating through the universe of item results. For example, a specific or relative page (e.g., next or previous) of the search results may be requested. Similarly, a specific or relative item may be requested using the generic results request page. In an embodiment, one or more values are passed to server 104 for use in responding to the request. These values may include the query, the current page number, the number of items currently being displayed, and a navigation action to take. With respect to the action, a standard set of values (e.g., next, prev) may be defined such that both the browser and server use the same terminology for requesting and transmitting paginated results. Another transmitted value may be the user preference for how many item results to retrieve. In various embodiments, these values may be included directly in the URL request in the clear (e.g., " . . . results.html?query=cars&items=10&currentPage=1&itemsShown=4&action=next"), encrypted, or be hidden when sent with the request. Values may also be transmitted to the server when using specific request URLS (e.g., " . . . nextResults.html?query=cars&currentPage=1").

Upon receiving the request, server 104 may process the values included in the request to format a new web page to transmit back to client device 102. For example, if a request is received using "nextResults.html?currentPage=1," server 104 may format a page with the second page of results. The new formatted page may include an updated <PAGING> tag indicating the value of variable "Page_Num" is now two. In various embodiments, upon receiving the new page from server 104, browser 112 may parse the <PAGING> tag and update pagination navigation controls 118.

Accordingly, in various embodiments, the use of the <PAGING> tag allows both browser 112 and server 104 to provide paginated results more easily. This is different than the traditional mechanism where the pagination controls are provided as part of the web page being transmitted to the user. For example, traditionally, a web server may include code within a web page, which when rendered by the browser in content window 116, provide links to retrieve a different page of a set of search results. Thus, the browser does not have knowledge that the web page is one of many pages of results and the browser does not provide controls to navigate the search results. Additionally, the pagination controls are part of the content rendered within content window 116. In contrast, using a <PAGING> tag allows the browser to recognize paginated results and provide pagination navigation controls that are distinct from content rendered within content window 116.

Figure 3:
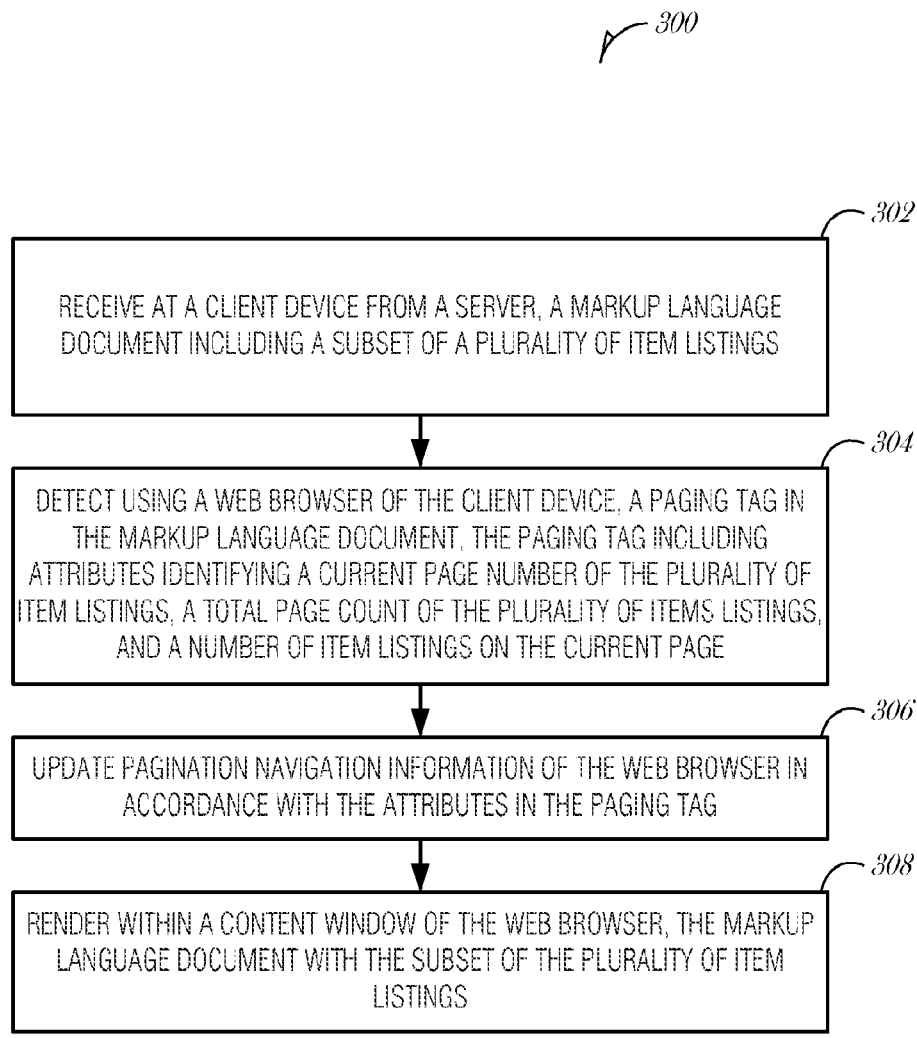
FIG. 3 is a flowchart illustrating a method for browser based pagination controls, according to an example embodiment.

FIG. 3 is a flowchart illustrating a method 300 for providing browser based pagination controls. The following operations are not required to be performed in a consecutive order or sequence, although the illustrated order depicts use of the method in a common browsing experience.

At block 302, in an embodiment, the client device receives from the server, a markup language document including a subset of a plurality of light listings. The document may be received in response to a request sent from a web browser of a client device. The request may include an item query as discussed herein. For example, the item query may be a search query.

At block 304, in an embodiment, the web browser detects a paging tag in the markup language document. The paging tag may include attributes identifying a current page number of the plurality of item listings, a total page count of the plurality of item listings, and a number of item listings on the current page. The paging tag may be part of a standardized markup language such as the HTML. The paging tag may also optionally include next_page, prev_page, first_page, and last_page attributes.

At block 306, in an embodiment, pagination navigation information of the web browser is updated in accordance with the attributes in the paging tag. For example, updating may include reading values of the attributes in the paging tag and associating at least one of the values with a pagination navigation control of the web browser. For example, the value of the current page number attribute included in the paging tag may be displayed in pagination navigation controls of the web browser. In an embodiment, a pagination navigation control is a last page of results navigation control and actuating the last page of results navigation control transmits a request for a subset of the plurality of item listings corresponding to the last page of the plurality of item listings.

At block 308, in an embodiment, page markup language document with the subset of the plurality of item listings is rendered with the content window of the web browser. This may include the browser interpreting the plurality of tags for formatting and displaying content between the tags according to the formatting. Thus, in various embodiments, the actual tags are not displayed in the content window.

In further embodiments, the web browser may detect actuation of a pagination navigation control of the web browser. Actuation may include touch gestures, motion gestures, audio input, pointer navigation, etc. In an embodiment, the pagination navigation control is not viewable by the browser. In response to the actuation, the web browser may transmit a request for a different subset of the plurality of item listings based on the actuation and the pagination navigation information. For example, the pagination navigation information may include a value read from the paging tag that includes a website address to which the request is directed.

In various embodiments, the request for different subset of the property item listings include the requested page number of the plurality of item listings. For example the request may indicate that a user wishes to see the fourth page of the results. This information may be encoded within the request as discussed herein. The request may also include requested change to the number of item listings on the current page. For example a user may wish to see twenty items per page.

The change may be based on a user preference stored within the web browser itself that is not web site specific. Also, a default value for the number of items to view per page may be used when one is not set by the user.

The above embodiments and examples may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 4:
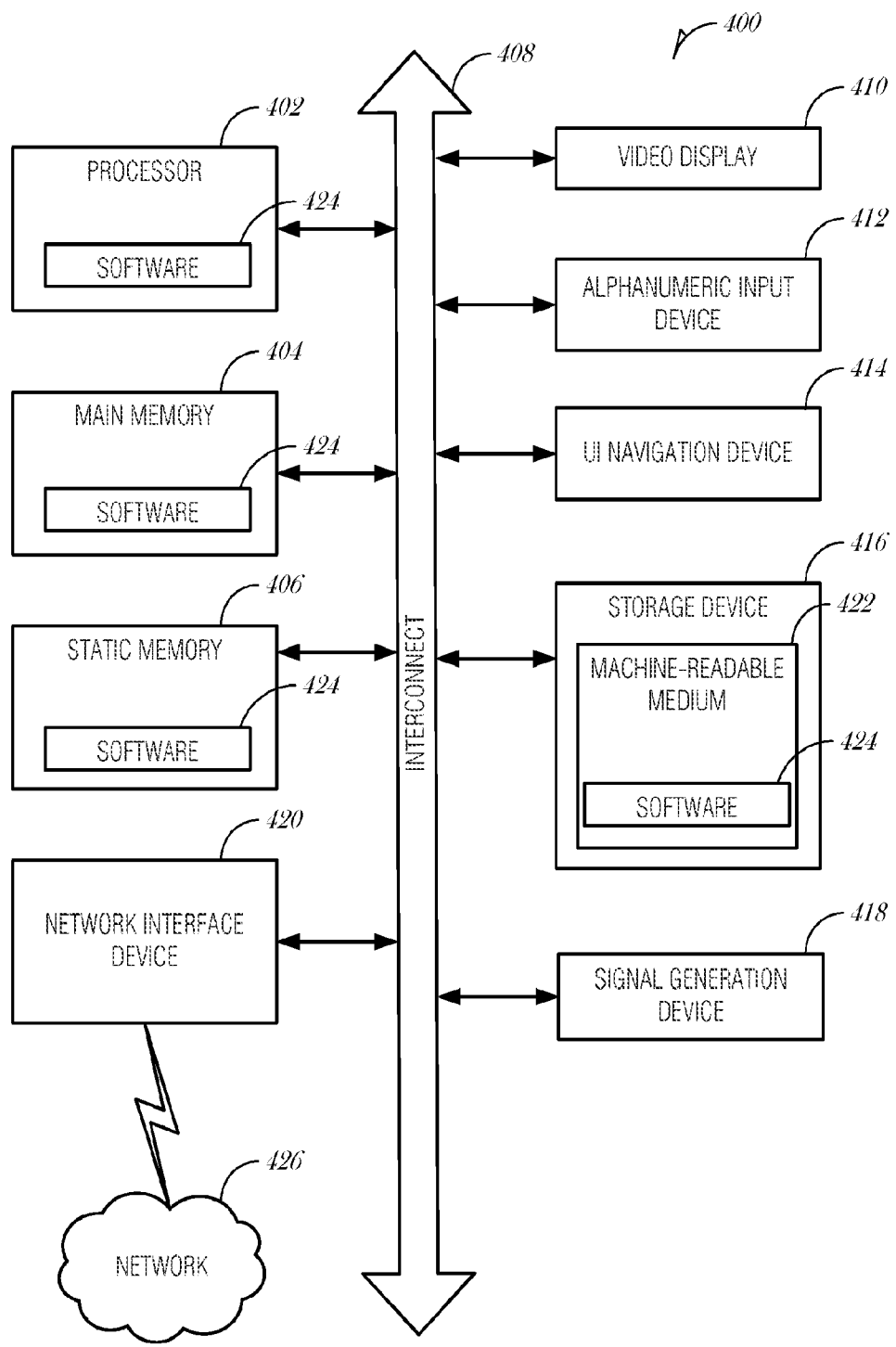
FIG. 4 is a block diagram illustrating a machine in the example form of a computer system, within which a set or sequence of instructions for causing the machine to perform any one of the methodologies discussed herein may be executed, according to an example embodiment.

FIG. 4 is a block diagram illustrating a machine in the example form of a computer system 400 (e.g., computing device), within which a set or sequence of instructions for causing the machine to perform any one of the methodologies discussed herein may be executed, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes processor 402 (e.g., a general purpose processing unit, a graphics processing unit (GPU) or both), main memory 404, and static memory 406, which communicate with each other via interconnect 408 (e.g., a bus or link). Computer system 400 may further include video display 410, alphanumeric input device 412 (e.g., a keyboard), and user interface (UI) navigation device 414 (e.g., a mouse). In one embodiment, video display 410, input device 412, and UI navigation device 414 are incorporated into a touch screen display. Computer system 400 may additionally include storage device 416 (e.g., a drive unit), signal generation device 418 (e.g., a speaker), network interface device 420, and one or more sensors (not shown), such as a global positioning system (GPS) sensor, compass, accelerometer, or other sensor.

Storage device 416 includes machine-readable medium 422 on which is stored one or more sets of data structures and instructions 424 (e.g., software) embodying or utilized by any one or more of the methodologies or functions described herein. Instructions 424 may also reside, completely or at least partially, within main memory 404, static memory 406, and/or within processor 402 during execution thereof by computer system 400, with main memory 404, static memory 406, and processor 402 also constituting machine-readable media.

While machine-readable medium 422 is illustrated in an example embodiment to be a single medium, the term "machine-readable medium" may include a single medium or multiple media (e.g., a centralized or distributed database, and/or associated caches and servers) that store one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Instructions 424 may further be transmitted or received over communications network 426 using a transmission medium via network interface device 420 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Additional Notes & Examples

Example 1 may include subject matter (such as a method, means for performing acts, or machine-readable medium including instructions that, when executed by a computing device, cause the computing device to performs acts) comprising receiving at a client device from a server, a markup language document including a subset of a plurality of item listings, detecting using a web browser of the client device, a paging tag in the markup language document, the paging tag including attributes identifying a current page number of the plurality of item listings, a total page count of the plurality of items listings, and a number of item listings on the current page, updating pagination navigation information of the web browser in accordance with the attributes in the paging tag, and rendering within a content window of the web browser, the markup language document with the subset of the plurality of item listings.

In Example 2, the subject matter of Example 1 may optionally include detecting actuation of a pagination navigation control of the web browser and transmitting a request for a different subset of the plurality of item listings based on the actuation and based on the pagination navigation information.

In Example 3, the subject matter of Example 2, may optionally include wherein the request for a different subset of the plurality of item listings includes a requested page number of a plurality of pages of the plurality of item listings.

In Example 4, the subject matter of any of Examples 2 to 3, may optionally include wherein the request for a different subset of the plurality of item listings includes a requested change to the number of item listings on a page.

In Example 5, the subject matter of any of Examples 2 to 4, may optionally include wherein detecting actuation of the pagination navigation control includes detecting a touch gesture on a display.

In Example 6, the subject matter of any of Examples 1 to 5, may optionally include reading values of the attributes in the paging tag and associating at least one of the values with a pagination navigation control of the web browser.

In Example 7, the subject matter of any of Examples 1 to 6, may optionally include wherein the pagination navigation control is a last page of results navigation control, wherein actuating the last page of results navigation control transmits a request for a subset of the plurality of item listings corresponding to the last page of the plurality of item listings.

In Example 8, the subject matter of any of Examples 1 to 7, may optionally include storing a default value for a number of item listings per page to display in the web browser.

Example 9 may include subject matter (such as a method, means for performing acts, or machine-readable medium including instructions that, when executed by a computing device, cause the computing device to performs acts) comprising a web browser, executed on at least one processor, configured to receive, from a server, a markup language document including a subset of a plurality of item listings, detect a paging tag in the markup language document, the paging tag including attributes identifying a current page number of the plurality of item listings, a total page count of the plurality of items listings, and a number of item listings on the current page, update pagination navigation information of the web browser in accordance with the attributes in the paging tag, and display the page markup language document with the subset of the plurality of item listings.

In Example 10, the subject matter of Example 9, wherein the web browser is to transmit a request to the server, the request including a search query and the subset of the plurality of item listings include search results based on the search query.

In Example 11, the subject matter of any of Examples 9 to 10, may optionally include wherein the paging tag is part of a standardized markup language.

In Example 12, the subject matter of Example 11, may optionally include wherein the standardized markup language is the HyperText Markup Language.

In Example 13, the subject matter of any of Examples 9 to 12, may optionally include wherein the web browser includes a pagination navigation control that includes a location identifier indicating the current page number as identified in an attribute of the paging tag.

In Example 14, the subject matter of Example 13, may optionally include wherein the web browser is configured to hide the pagination navigation control.

What is claimed is:
1. At least one non-transitory machine-readable medium comprising a plurality of instructions for navigating a markup language document including a plurality of item listings that, in response to being executed on a computing device, cause the computing device to:
- receive, at the client device from a server, a markup language document including a first page of the markup language document including a first subset of a plurality of item listings and a second page of the markup language document including a second subset of the plurality of item listings;
- detect, using a web browser of a client device, a plurality of paging tags in the markup language document;
- divide the markup language document into a plurality of pages based on each subset of the plurality of item listings between a pair of paging tags of the plurality of paging tags of the markup language document, each subset of the plurality of item listings comprising one page of the plurality of pages, a first paging tag pair of the plurality of paging tags corresponding to the first page and a second paging tag pair of the plurality of paging tags corresponding to the second page, wherein a page in the plurality of pages is specified by an open tag and an end tag where open tags include attributes describing the plurality of pages, the attributes including all of a current page number, a next page identification, a previous page identification, a first page identification, a last page identification, a total number of pages, a number of items per page, and a total number of items;
- update pagination navigation information of the web browser in accordance with the division of the markup language document into the plurality of pages and the attributes of open tags;
- render within a content window of the web browser, the page of the markup language document with the subset of the plurality of item listings
- detect actuation of a pagination navigation control of the web browser; and
- render within the content window of the web browser, the second page of the markup language document with the second subset of the plurality of item listings.

2. The machine-readable medium of claim 1, further comprising instructions to:
- detect actuation of a pagination navigation control of the web browser; and
- transmit a request for a different subset of the plurality of item listings based on the actuation and based on the pagination navigation information.

3. The machine-readable medium of claim 2, wherein the request for a different subset of the plurality of item listings includes a requested page number of the plurality of pages of the markup language document.

4. The machine-readable medium of claim 2, wherein the request for a different subset of the plurality of item listings includes a requested change to the number of item listings on a page.

5. The machine-readable medium of claim 2, wherein detecting actuation of the pagination navigation control includes detecting a touch gesture on a display.

6. The machine-readable medium of claim 1, wherein updating pagination information of the browser comprises:
- reading values of attributes identifying a current page number of the markup language document, a total page count of the markup language document, and a number of item listings on the current page of the markup language document in the paging tag; and
- associating at least one of the values with a pagination navigation control of the web browser.

7. The machine-readable medium of claim 6, wherein the pagination navigation control is a last page of results navigation control, wherein actuating the last page of results navigation control transmits a request for a subset of the plurality of item listings corresponding to the last page of the markup language document.

8. The machine-readable medium of claim 1, further comprising instructions to store a default value for a number of item listings per page to display in the web browser.

9. The machine readable medium of claim 1, wherein at least one of the next page, the previous page, the first page, or the last page have a link as a value.

10. A system for navigating a markup language document including a plurality of item listings comprising:
- a web browser of a client device, executed on at least one processor, configured to:
  - receive, at the client device from a server, a markup language document including a first page of the markup language document including a first subset of a plurality of item listings and a second page of the markup language document including a second subset of the plurality of item listings;
  - detect a plurality of paging tags in the markup language document;
  - divide the markup language document into a plurality of pages based on each subset of the plurality of item listings between a pair of paging tags of the plurality of paging tags of the markup language document, each subset of the plurality of item listings comprising one page of the plurality of pages, a first paging tag pair of the plurality of paging tags corresponding to the first page and a second paging tag pair of the plurality of paging tags corresponding to the second page, wherein a page in the plurality of pages is specified by an open tag and an end tag where open tags include attributes describing the plurality of pages, the attributes including all of a current page number, a next page identification, a previous page identification, a first page identification, a last page identification, a total number of pages, a number of items per page, and a total number of items;
  - update pagination navigation information of the web browser in accordance with the division of the markup language document into the plurality of pages and the attributes in the open tags specifying the plurality of pages;
  - display, within a page of the web browser, the markup language document with the subset of the plurality of item listings
  - detect actuation of a pagination navigation control of the web browser; and
  - render within the content window of the web browser, the second page of the markup language document with the second subset of the plurality of item listings.

11. The system of claim 10, wherein the web browser is to transmit a request to the server, the request including a search query and the subset of the plurality of item listings include search results based on the search query.

12. The system of claim 10, wherein the paging tag is part of a standardized markup language.

13. The system of claim 12, wherein the standardized markup language is the HyperText Markup Language.

14. The system of claim 10, wherein the web browser includes a pagination navigation control that includes a location identifier indicating the current page number as identified in an attribute of the paging tag.

15. The system of claim 14, wherein the web browser is configured to hide the pagination navigation control while still displaying the markup language document with the subset of the plurality of item listings.

16. The system of claim 10, wherein at least one of the next page, the previous page, the first page, or the last page have a link as a value.

17. A method for navigating a markup language document including a plurality of item listings, the method comprising:
- receiving, at the client device from a server, a markup language document including a first page of the markup language document including a first subset of a plurality of item listings and a second page of the markup language document including a second subset of the plurality of item listings;
- detecting, using a web browser of a client device, a plurality of paging tags in the markup language document;
- dividing the markup language document into a plurality of pages based on each subset of the plurality of item listings between a pair of paging tags of the plurality of paging tags of the markup language document, each subset of the plurality of item listings comprising one page of the plurality of pages, a first paging tag pair of the plurality of paging tags corresponding to the first page and a second paging tag pair of the plurality of paging tags corresponding to the second page, wherein a page in the plurality of pages is specified by an open tag and an end tag where open tags include attributes describing the plurality of pages, the attributes including all of a current page number, a next page identification, a previous page identification, a first page identification, a last page identification, a total number of pages, a number of items per page, and a total number of items;
- updating pagination navigation information of the web browser in accordance with the division of the markup language document into the plurality of pages and the attributes of open tags;
- rendering within a content window of the web browser, the page of the markup language document with the subset of the plurality of item listings
- detecting actuation of a pagination navigation control of the web browser; and
- rendering within the content window of the web browser, the second page of the markup language document with the second subset of the plurality of item listings.

18. The method of claim 17, further comprising:
- detecting actuation of a pagination navigation control of the web browser; and
- transmitting a request for a different subset of the plurality of item listings based on the actuation and based on the pagination navigation information.

19. The method of claim 18, wherein the request for a different subset of the plurality of item listings includes a requested page number of the plurality of pages of the markup language document.

20. The method of claim 18, wherein the request for a different subset of the plurality of item listings includes a requested change to the number of item listings on a page.

21. The method of claim 18, wherein detecting actuation of the pagination navigation control includes detecting a touch gesture on a display.

22. The method of claim 17, further comprising storing a default value for a number of item listings per page to display in the web browser.

23. The method of claim 17, wherein at least one of the next page, the previous page, the first page, or the last page have a link as a value.

* * * * *